L. C. WILLCOX.
PROCESS FOR MAKING PIE CRUSTS AND SIMILAR PASTRY.
APPLICATION FILED MAR. 13, 1917.

1,330,018.

Patented Feb. 3, 1920.
4 SHEETS—SHEET 1.

Fig. 1.

Witness
W. H. Richmond

Inventor
Leland C. Willcox
By Orwig and Bauer
Attys.

L. C. WILLCOX.
PROCESS FOR MAKING PIE CRUSTS AND SIMILAR PASTRY.
APPLICATION FILED MAR. 13, 1917.

1,330,018.

Patented Feb. 3, 1920.
4 SHEETS—SHEET 2.

Witness.
W H Richmond.

Inventor.
Leland C. Willcox
By Arwig & Bair
Att'ys.

L. C. WILLCOX.
PROCESS FOR MAKING PIE CRUSTS AND SIMILAR PASTRY.
APPLICATION FILED MAR. 13, 1917.

1,330,018.

Patented Feb. 3, 1920.
4 SHEETS—SHEET 3.

UNITED STATES PATENT OFFICE.

LEALAND C. WILLCOX, OF DES MOINES, IOWA, ASSIGNOR TO NATIONAL PIE CRUST COMPANY, OF MILWAUKEE, WISCONSIN, A CORPORATION OF WISCONSIN.

PROCESS FOR MAKING PIE-CRUSTS AND SIMILAR PASTRY.

1,330,018. Specification of Letters Patent. Patented Feb. 3, 1920.

Application filed March 13, 1917. Serial No. 154,611.

*To all whom it may concern:*

Be it known that I, LEALAND C. WILLCOX, a citizen of the United States, and resident of Des Moines, in the county of Polk and State of Iowa, have invented a certain new and useful Process for Making Pie-Crusts and Similar Pastry, of which the following is a specification.

The object of my invention is to provide a simple and efficient process for making pastry of the type in which a flat or rolled dough is used and is baked on automatic machinery.

More particularly it is my object to provide a process employing some such machine as that disclosed in my application for patent, Serial Number 85,424, filed March 20, 1916, now Patent 1,305,183, granted May 27, 1919.

A further object is to provide a process for baking pastry of the general kind mentioned, wherein the pastry is rolled out in the form of a dough and is then cut into flat blanks of the size desired, and thereafter is picked up by automatic machinery, such as a pneumatic suction device, and carried to proper position, and deposited on an oven member, after which another oven member is pressed over the dough blank for drawing and shaping the dough into the form of a receptacle, after which both oven members are heated for thoroughly baking the dough on both sides.

My invention consists in the practice of the steps hereinafter more fully set forth.

In the practice of my improved process for baking pastry, I first prepare the dough by rolling it out in a flat sheet. This can be done in any suitable way, as for instance, by well-known machinery.

The dough is then placed on a table.

I preferably provide for cutting the dough a mechanism such as that shown in my application for patent above identified, employing an arm capable of rotation around a supporting upright, having on its end a dough cutting member connected with a vacuum device, which arm can be vertically reciprocated for dropping the cutting device downwardly above the table for cutting the dough blank from the sheet of dough, at the same time, the dough is subjected to suction for holding it against the cutting device. The arm carrying and cutting device is then raised and rotated around its support to position for depositing the blank on an oven.

Various types of ovens may be employed, but I preferably use individual ovens of the type mounted on arms adapted to rotate around a support, and preferably provided with upper and lower oven members, one of said members being capable of reciprocation with relation to the other member.

The oven members must be of such shape as that when pressed together with the dough blank between them, they will form the blank into a receptacle such as a pie crust or the like.

I preferably use a lower oven member having somewhat the form of an inverted plate or saucer, such as that shown in my application, above identified, and an upper oven member of substantially the same shape. The blank is deposited on the lower oven member from the dough carrying means, and thereafter the upper oven member is pressed downwardly over the blank for drawing it and pressing it into the shape of a pie crust or the like.

A suitable heating means is provided for each of the upper and lower oven members, so that the pie crusts or the like may be thoroughly baked from both sides through the progress of the ovens around their support.

Before the ovens make a complete revolution and return to their receiving position, the upper oven member is raised and the lower oven member is tilted for discharging the completed pie crust or other baked pastries. In the drawings filed herewith I have illustrated a form of machine such as that shown in my hereinbefore identified prior application, with which my improved process may be practised.

In said drawings.

My improved pastry baking machine comprises a plurality of ovens adapted to move around a central point. Adjacent to the oven supporting means are a plurality of devices arranged to move around another central point and adapted to be operated to cut dough into suitable shapes and to pick up the portions so cut and to carry them to and deposit them upon the ovens.

Figures 2, 3:
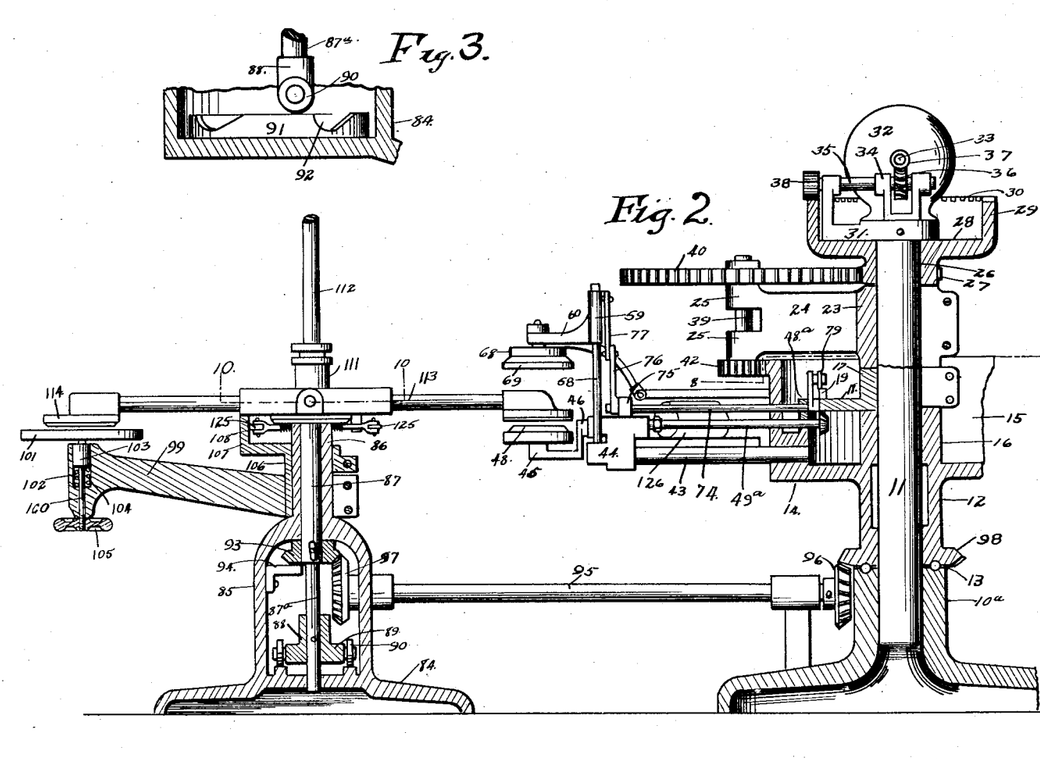
Fig. 2 shows a vertical sectional view through said machine.
Fig. 3 shows an enlarged, detailed, sectional view of the parts at the lower end of the shaft which operates the dough cutting and carrying mechanism.

In the accompanying drawings I have shown in Fig. 2 a supporting stand which I have indicated by the reference character 10a. Mounted in the support or stand 10a and extending upwardly therefrom is a heavy upright shaft 11. Above the support 10a, rotatably mounted on the shaft 11 is a sleeve 12 which is supported on the stand 10a by ball bearings 13. Near the upper end of the sleeve 12 is a laterally extending wall or flange 15. The sleeve 12 has a portion 16 which extends to position above the flange 14 but does not extend upwardly as far as the flange or wall 15.

Fixed on the shaft 11 above the sleeve portion 16 is a collar 17 having at its lower end a laterally extending web 18. Formed on the upper surface of the web 18 near its periphery and on one side of said web is a cam 19, the purpose of which will hereinafter be described.

Formed on the lower surface of the web 18 near its periphery is a downwardly extending flange 20 provided at a certain point with teeth 21 and at a certain point with a notch 22, the purpose of which will be hereinafter referred to.

Above the collar 17 there is fixed on the shaft 11 another collar 23 having a laterally extending arm 24 provided with vertically arranged and alined bearings 25.

Rotatably mounted on the shaft 11 above the collar 23 is a hub 26 having formed on its lower portion a gear 27.

Formed on the upper portion of the hub 26 is a laterally extending annular flange 28, having at its outer edge an upwardly extending flange or wall 29, the upper edge of which is provided with gear teeth 30.

Fixed on the upper end of the shaft 11 is a support 31 on which is mounted a motor 32 having a shaft 33. Mounted in suitable bearings 34 on the support 31 is a shaft 35 on which is a worm gear 36 meshing with worm 37 on the motor shaft 33. On the outer end of the shaft 35 is a pinion 38 in mesh with the gear teeth 30.

In the bearings 25 is mounted an upright shaft 39, on the upper end of which is a gear 40 in mesh with the gear 27. On the upper portion of the wall or flange 15 are external gear teeth 41 in mesh with a small gear 42 on the lower end of the shaft 39.

Thus it will be seen that when the motor shaft 33 is rotated, rotation will be imparted to the shaft 35 and the pinion 38 thereon. The wall 29, flange 28 and gear 27 will be rotated, thereby imparting rotation to the wall or flange 15 through the medium of the gears 40 and 42 and the shaft 39.

Extending radially outwardly from the lower portion of the wall or flange 16 is a plurality of supporting arms 43. Mounted on the outer end of each arm 43 is a casting or the like 44.

Figures 4, 5, 6, 7:
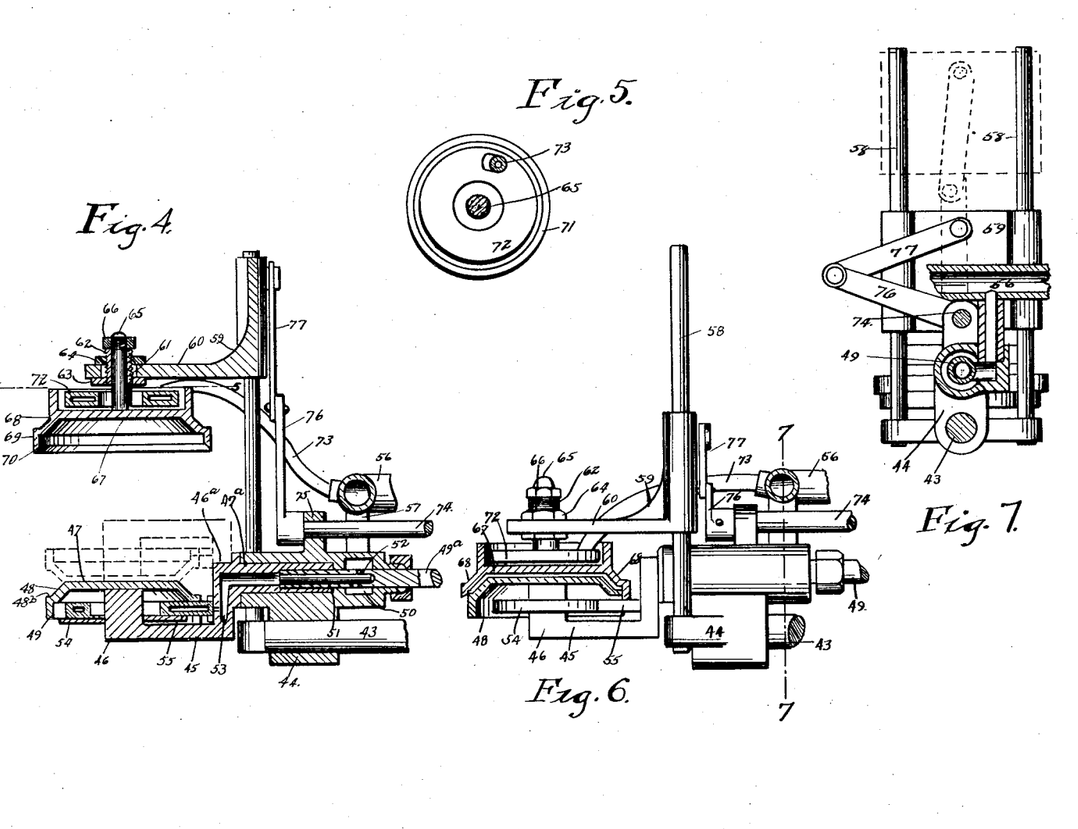
Fig. 4 shows a vertical, sectional view through one of the ovens and the parts connected therewith.
Fig. 5 shows a horizontal, sectional view taken on the line 5—5 of Fig. 4.
Fig. 6 shows an enlarged, detailed view of the mechanism connected with one of the ovens, the oven itself being shown in vertical section.
Fig. 7 shows a detailed, sectional view taken on the line 7—7 of Fig. 6.
Figures 8, 9, 10, 11, 12:
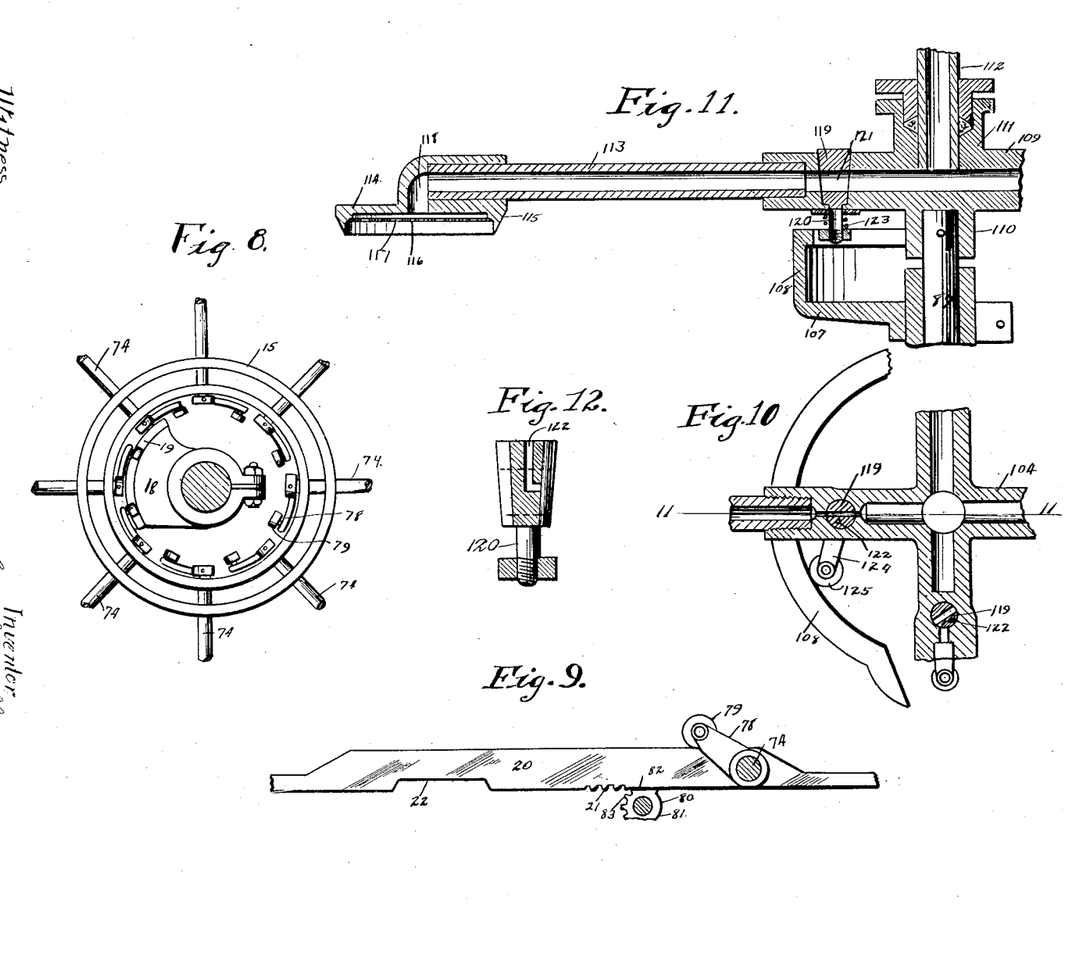
Fig. 8 shows a horizontal sectional view taken on the line 8—8 of Fig. 2.
Fig. 9 shows a detailed view of part of the mechanism for tilting the ovens.
Fig. 10 shows a horizontal sectional view taken on the line 10—10 of Fig. 2.
Fig. 11 shows a vertical, sectional view taken on the line 11—11 of Fig. 10.
Fig. 12 shows a vertical, sectional view through one of the air controlling valves.

Adjacent to each casting 44 is a lower oven member which may in each case comprise a horizontal bar or the like 45, having at its outer end an upwardly extending support 46, upon which rests a lower oven member which may be of any desired shape, but as shown is shaped like an inverted pie tin, having a flat bottom 47 and a flaring outer wall 48, having at its outer edge a flat horizontal annular shoulder 48b with a sharp outer edge and a downwardly extending flange 49, as shown in Fig. 4. In this connection it may be noted that the oven members may be of any desired shape for the purpose of baking pies or small cups or the like. But said oven members are preferably arranged in inverted position, or in other words, in such a way as to bake the dough into a crust while holding the pie crust or the like in inverted position.

At the inner end of the bar 45 is an upwardly extending tubular member 46a, having at its upper end a laterally extending tube or sleeve 47a extending into a suitable opening in the casting 44.

Spaced inwardly from the flange or wall 15 on the flange 14 is an upwardly extending flange 48a.

Extending through the flanges 48a and 15, which form spaced bearings therefor, is a plurality of radially extending shafts 49ª. Each shaft 49ª at its outer end extends into a suitable opening in the casting 44, as shown in Fig. 4, and has its outer end received within the inner end of the sleeve 47ª by a tight joint.

Each casting 44 is provided with a fuel chamber or passage 50 surrounding the end of the shaft 49ª. The end of the shaft 49ª, received in the fuel passage 50 and the end of the sleeve 47ª, is hollow, being provided with an opening or passage 51. The wall of that portion of the shaft 49ª which has the opening or passage 51 is provided with openings 52, whereby communication is afforded between the passage 51 and the fuel opening or passage 50.

The upwardly extending arm 46ª is provided with a passage 53 which communicates with the opening in the sleeve 47ª. Suitably mounted below the bottom 47 of each lower oven member is a suitable burner 54. A tube 55 leads from the passage 53 to the burner 54 of each oven.

In this connection it should be noted that the sleeve 47ª and the shaft 49ª are fixed to each other and are rotatably mounted in the casting 44. It should also be noted that the member 46 in a sense forms a crank and that the lower oven members are mounted below the longitudinal axis of the shaft 49ª.

Suitably mounted, preferably above the casings 44, is an annular fuel supply tube 56. A branch tube 57 leads from the fuel supply tube 56 to each fuel passage 50.

Figure 1:
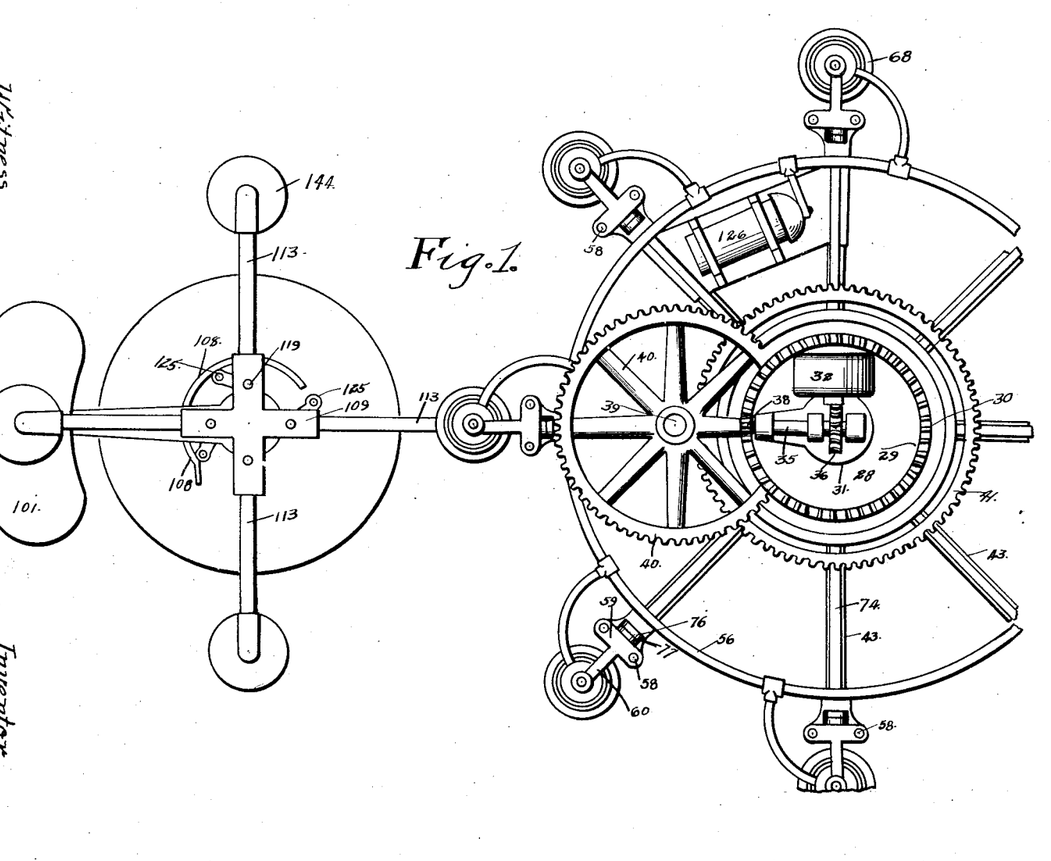
Figure 1 shows a top or plan view of the pastry baking machine embodying my invention.

Extending upwardly from each casting 44 is a pair of uprights 58 preferably arranged in the case of each casting 44 on opposite sides of the sleeve 47ª, as shown in Figs. 1 and 7.

Slidably mounted upon both uprights 58 of each pair is an oven supporting bracket 59, capable of vertical reciprocation on the uprights 58.

Each bracket 59 has an arm 60 extending radially outwardly, as shown in Figs. 1, 4 and 6. Each arm 60 is provided near its outer end with a slot 61. Mounted in the slot 61 is an externally screw-threaded sleeve 62 having at its lower end a flange 63 adapted to engage the lower surface of the arm 60. On the upper end of the sleeve 62 is screwed a nut 64. The sleeve 62 is of smaller diameter than the slot 61, so that by loosening the nut 64 the sleeve 62 may be given slight adjustment in any direction.

Mounted in the sleeve 62 is an upright rod or the like 65, having on its upper end a nut 66 and supporting at its lower end the upper oven member which is in general similar in shape to the lower oven member, having a top 67 and a downwardly and outwardly flaring wall 68, at the lower edge of which is an annular downwardly extending flange 69, having a beveled edge 70, forming a trimmer for the dough. The top 67 has at its periphery an upwardly extending flange 71. By adjusting the sleeve 62 it will be seen that the upper oven member may be adjusted to fit in its exact position above the lower oven member, whereby the parts may be adjusted in spite of any slight variations in size, which may occur in making the parts in the shop.

In the space within the flange 71 is mounted a burner 72 similar to the burner 54 which is fed by a flexible tube 73 which communicates with the fuel supply tube 56.

It will be obvious that by simply not tightening the nut 64, the coacting inclined walls 48 and 68 will cause the oven members to automatically center when moved together.

Provision has been made for raising and lowering the upper oven members at proper times. Mounted in suitable bearings in the flanges 15 and 48ª and extending radially outwardly therefrom, is a plurality of rotatable shafts 74. At their outer ends shafts 74 are mounted on bearings 75 on the castings 44. Fixed to the outer ends of shafts 74 are laterally extending arms 76. Pivoted to the outer end of each arm 76 is a link 77. The upper end of each link 77 is pivoted to one of the brackets 59.

The parts just described are so arranged that when a shaft 74 is rotated, the upper oven member connected therewith will be raised or lowered, depending upon the direction of rotation of the shaft 74.

Fixed on the inner end of each shaft 74 is an arm 78, on one end of which is a roller 79, adapted to engage and coact with the cam 19 hereinbefore referred to. The parts are so arranged that when each shaft 24 reaches a certain position in its movement around the upright shaft 11, the roller 79 will engage the cam 19 and thereupon raise the upper oven member. The oven member will be held in its raised position during a comparatively short part of the travel of the oven around the upright 11, and will then drop to its lower position above the lower oven member.

On the inner end of each shaft 49ª is a mutilated gear 80, having opposite flat sides 81 and 82 and on one side teeth 83. The teeth 21 and the notch 22 hereinbefore described, and the mutilated gears 80 are so arranged with relation to each other that the flat side 82 normally slides along the lower edge of the flange 20 whereby the lower oven member is held in its normal horizontal position. Just after the roller 79 strikes the cam 19 for raising the upper oven member, the mutilated gear reaches the teeth 21 which project downwardly below the flange 20 and engage the teeth 83 and thereby impart preferably a little over one-fourth of a revolution to the shaft 49, thereby tilting the lower oven member so that the baked crust thereon will slide off on to a table or other receiving means.

It is obvious that the parts can be so made as to impart any degree of tilting movement to the lower oven member which may be desired.

When the oven has been tilted a certain distance, the flat side 81 of mutilated gear 80 reaches and engages the lower edge of the flange 20 and slides along the same, holding the oven in its tilted position, until the notch 22 is reached, whereupon the weight of the lower oven member and the bell crank or off-set mounting of the oven, with relation to its operating shaft 49ª, will cause the oven to drop to its position shown in Fig. 2, and as the travel of the ovens around the upright 11 continues, the portion 82 of the mutilated gear will again travel on the lower edge of the flange 20. We preferably provide a gas generator 126 for supplying a gas fuel to the tube 56.

After the oven has returned to its normal position just mentioned, the unbaked dough form is deposited thereon by a mechanism which will be hereinafter described, and immediately after such dough has been deposited on the oven, the roller 79 passes the cam 19 and the upper oven member is lowered.

For cutting and feeding the dough blanks to the ovens the following mechanism has been provided:

Suitably located is a supporting stand 84 having a hollow upwardly extending standard 85. The hollow standard 85 is provided at its upper end with an upwardly extending sleeve 86. Mounted in the sleeve 86 and the supporting stand 84 is an upright shaft 87, the lower portion of which at 87ª is slightly reduced in size. The shaft 87 is so mounted that it may be permitted to have slight vertical sliding movement. Fixed on the lower end of the shaft 87 is a collar or the like 88, on which are opposite laterally extending arms 89, mounted on which are rollers 90. The rollers 90 travel on a cam-shaped track 91 having at certain intervals the notches 92.

Mounted on the shaft 87 to permit slidable movement thereon, but non-rotatable with relation thereto at the lower end of the sleeve 86, is a gear 93. The gear 93 is held by the brackets 94 from sliding downwardly. The shaft 87 is rotated at proper speed with relation to the movements of the ovens by means of a shaft 95 mounted in bearings on the supporting stand 10ª and the hollow standard 85, and has on its ends the beveled gears 96 and 97. The beveled gear 97 meshes with the beveled gear 93. The beveled gear 96 meshes with the beveled gear 98 formed on the lower portion of the sleeve 12.

On the sleeve 86 above the standard 85 is a laterally extending arm 99. Slidably mounted in the outer end of the arm 99 is an upright shaft 100, which supports at its upper end a table 101. In the upper portion of the outer end of the arm 99 is an enlarged opening 102. Mounted on the shaft 100 within the opening 102 is a collar 103. On the shaft 100 in the opening 102 between the bottom thereof and the collar 103 is a coil spring 104.

The lower end of the shaft 100 is screw-threaded and on said lower end is mounted a hand wheel 105, or the like, whereby the tension on the spring 104 may be regulated.

It will be seen that a downward blow on the table 101 is taken up by the spring 104.

Mounted on the sleeve 86 above the arm 99 is a hub 106, having a laterally extending flange 107, at the outer edge of which is an upwardly extending flange 108 forming a cam surface for a purpose hereinafter referred to.

Fixed on the upper end of the shaft 87 above the sleeve 86 is a web having a plurality of radially extending hollow arms 109, a downwardly extending socket 110, receiving the shaft 87, and an upwardly extending tube 111, which communicates with all of the tubular arms 109 and receives the air conducting tube 112 by means of a tight joint whereby the tube 111 may be permitted to rotate with relation to the tube 112.

Mounted in the outer end of each tubular arm 109 is a radially extending pipe 113 carrying at its outer end a horizontal disk 114 having at its periphery a downwardly extending sharp-edged flange 115 forming a dough cutting device. Mounted within the flange 115, and slightly spaced from the body of the disk 114 is a comparatively thin plate 116 having a plurality of openings 117 extending through it. The space above the plate 116 communicates by means of the passage 118 with the pipe 113.

Mounted in each tubular arm 109 is a valve 119 having a downwardly extending stem 120. Each valve 119 has a horizontal passage 121 extending through it and also has a by-pass 122. In one position of the rotation of the valve 119 the passage 121 registers with the opening in the tubular arm 109. In other positions of the valve 119 the passage 121 is closed, and in one of said other positions the lower end of the by-pass 122 communicates with that portion of the opening in the tubular arm 109 which is in direct communication with the pipe 113. The upper end of the by-pass 122 leads to the open air.

Fixed to the stem 120 and to the tubular arm 109 is a coil spring 123 whereby the valve 119 is normally held in position with the passage 121 closed and with the lower end of the by-pass 122 in communication with the pipe 113.

Fixed on the lower end of the stem 120 is a laterally extending arm 124 on the outer end of which is a roller 125 adapted to engage and coact with the cam-shaped flange 108. The air conducting tube 112 is adapted to be connected with a vacuum tank or pump or other means for producing a vacuum.

It should be understood that the number of ovens employed may be varied considerably and that the number of dough cutting and carrying means may be varied.

In the practical operation of my improved pastry baking machine, the oven burners are lighted and the ovens are heated. Dough rolled out in flat sheets is supplied to the table 101 and the motor is started, whereupon the shaft 87 will be rotated. As the shaft 87 rotates, the rollers 90 will reach the notches 92 in the cam-shaped track 91, whereupon the shaft 87 and the web at the upper hand thereof will suddenly drop, permitting the dough cutting edge of the flange 115 to engage the dough and to cut out the blank thereof of proper size for the ovens.

At the same time the roller 125 connected with the valve 119 of the dough cutting device which is above the table will engage the cam flange 108, thereby opening the valve 119, whereby a partial vacuum is created in the pipe 113 and the passage 118 and the dough blank is pressed against the plate 116. This operation is performed by each of the dough cutting and carrying devices during the rotation of the shaft 87.

When the first dough carrying device which has picked up a dough blank reaches a certain position in its rotation, one of the lower oven members has reached a position directly below the dough carrying device. At that instant the proper roller 125 leaves the cam 108 and the valve 119 is opened, whereupon air is permitted to pass through the by-pass 122 into pipe 113 and the passage 118 and the dough blank drops onto the lower oven member.

When the oven having the dough blank has traveled a little farther, the proper roller 79 leaves the cam 19 and the upper oven member is lowered to position over the dough blank. The edge 70 trims off the edge of the dough blank if that is necessary.

In this connection attention is called to the fact that the inner surface of the flange 69 is beveled at 70, and when the upper oven member is lowered over the lower oven member the beveled edge 70 slides downwardly adjacent to the edge of the shoulder 48ª with a shearing motion, as illustrated in Fig. 6, whereby the dough blank is accurately and uniformly trimmed.

As the rotation of the ovens around their common center continues, the dough blank is baked into a crust and the upper oven member is raised and the lower oven member tilted to discharge the baked crust.

It will be noted that the gearing device for connecting the oven and the dough carrying and depositing means are so arranged that the ovens rotate in one direction around the support 11, while the dough carrying means rotate in the opposite direction around their common center. It thus follows that when the members 14 are above the oven members, the dough carrying means and the dough receiving member of the ovens are moving in the same general direction, so that any centrifugal movement of the pastry when it is dropped will tend to carry said pastry above the oven and drop the pastry in proper position on the lower oven member. It is quite difficult in a machine of this kind, where the oven and pastry carrying means are both carrying and dropping the pastry blank, to drop it accurately on the oven, and the construction just explained greatly facilitates the proper depth of a pastry blank on the lower oven member.

The advantages of a machine of this kind can be largely seen from the foregoing description. The dough is handled automatically in cutting out a blank and picking up and carrying the blank to the oven for discharging the baked crust. We preferably discharge the baked crust upon the table on oiled paper and another piece of oiled paper is immediately placed over the baked crust when it is discharged from the open, so that the crust is never touched with the hands.

The ovens and the cutting devices may be made for making crusts of different kinds, and it will be noted that the ovens are so made as to shape the flat dough blank into the shape of a pie crust or the like, as may be desired. We consider it a considerable advantage to arrange the ovens so as to bake the crusts in inverted positions for the reason, among others, that it is then easier to discharge the baked crusts. The machine is built in a compact unit.

It will, of course, be understood that numerous changes may be made in the construction and arrangement of the parts of the machine. Other power may be employed for operating the machine where electricity is not easily or cheaply available. Suitable material is used for making the various parts, the ovens being built of aluminum preferably.

Some changes may be made in the means for practising my improved process, and various mechanisms may be used for carrying out the process.

I claim:—

1. The process of making pastry crusts comprising the forming of a flat sheet of dough, the cutting of a flat blank therefrom, the carrying of said blank from its position where it is cut from the sheet, and the depositing of said blank upon an oven member of such form as to make a receptacle of said blank when the blank is pressed to fit the oven member, the pressing of one oven member against another oven member with the dough blank received between them, for drawing and pressing the dough blank into the shape of a receptacle, the trimming of the blank with the shearing movement of the ovens and the baking of said dough blank.

2. The process of making pastry crusts comprising the forming of a flat sheet of dough, the cutting of a flat blank therefrom, the carrying of said blank from its position where it is cut from the sheet, and the depositing of said blank upon an oven member of such form as to make a receptacle of said blank when the blank is pressed to fit the oven member, the pressing of one oven member against another oven member with the dough blank received between them, and for drawing and pressing the dough blank into the shape of a receptacle and the baking of said dough blank, by heating said blank from both sides by means of individual heating devices for each oven.

3. The process of making pastry crusts comprising the forming of a flat sheet of dough, the cutting of a flat blank therefrom, the carrying of said blank from its position where it is cut from the sheet, and the depositing of said blank upon an oven member of such form as to make a receptacle of said blank when the blank is pressed to fit the oven member, the pressing of one oven member against another oven member with the dough blank received between them, and for drawing and pressing the dough blank into the shape of a receptacle and the baking of said dough blank, by applying proper heat to both the oven members, the moving of said oven members apart and the tilting of the oven member carrying the baked crust for discharging the same.

4. The process of baking pastry comprising the formation of a sheet of dough, and the placing of the same upon a table or the like, the cutting of a flat blank from said dough, by means of reciprocating an arm having thereon a dough cutting means, the application of a vacuum to the upper side of said blank for holding the blank against said cutting means, the raising of said cutting means, and the movement of the same to another position, the depositing of said blank upon an oven member, adapted when the blank is pressed against the same to form the blank into a receptacle, the pressing of one oven member toward another oven member with the blank between them for drawing and pressing the blank into the form of a receptacle, and the baking of said blank.

5. The process of baking pastry comprising the formation of a sheet of dough, and the placing of the same upon a table or the like, the cutting of a flat blank from said dough, by means of reciprocating an arm having thereon a dough cutting means, the application of a vacuum to the upper side of said blank for holding the blank against said cutting means, the raising of said cutting means, and the movement of the same to another position, the depositing of said blank upon an oven member, adapted when the blank is pressed against the same to form the blank into a receptacle, the pressing of one oven member toward another oven member with the blank between them for drawing and pressing the blank into the form of a receptacle, and the baking of said blank, by the application of heat to both of said oven members.

6. The process of baking pastry comprising the formation of a sheet of dough, and the placing of the same upon a table or the like, the cutting of a flat blank from said dough, by means of reciprocating an arm having thereon a dough cutting means, the application of a vacuum to the upper side of said blank for holding the blank against said cutting means, the raising of said cutting means, and the movement of the same to another position, the depositing of said blank upon an oven member, adapted when the blank is pressed against the same to form the blank into a receptacle, the pressing of one oven member toward another oven member with the blank between them for drawing and pressing the blank into the form of a receptacle, the baking of said blank, by the application of heat to both of said oven members, and the moving of said oven members apart, and the subsequent tilting of the other oven member for discharging the baked pastry.

7. The process of making pastry crusts, comprising the cutting of flat blanks from a sheet of dough, the moving of each blank from its position where it is cut from the sheet, the depositing of said blank on an oven member moving in the same general direction as the blank at the time of such deposit, the moving of a second oven member adjacent to the first oven member, and the heating of said oven members.

8. The process of making pastry crusts, comprising the cutting of flat blanks from a sheet of dough, the moving of each blank from its position where it is cut from the sheet, the depositing of said blank on an oven member moving in the same general direction as the blank at the time of such deposit, the moving of a second oven member adjacent to the first oven member, the heating of said oven members, and the baking of said crusts by means of individual heating means for said oven members.

9. The process of baking pastry including the placing of a dough blank on an oven member, and the movement of a second oven member to position adjacent to the first oven member convenient for baking the blank between the two oven members, and the shaping of the dough blank, and the trimming of its edges by a shear cut during said movement.

Des Moines, Iowa, February 7, 1917.

LEALAND C. WILLCOX.